United States Patent [19]
Regnier et al.

[11] Patent Number: 5,689,708
[45] Date of Patent: Nov. 18, 1997

[54] CLIENT/SERVER COMPUTER SYSTEMS HAVING CONTROL OF CLIENT-BASED APPLICATION PROGRAMS, AND APPLICATION-PROGRAM CONTROL MEANS THEREFOR

[75] Inventors: Barbara Ann Regnier, Mazeppa; David Nicholas Youngers, Rochester, both of Minn.

[73] Assignee: ShowCase Corporation, Rochester, Minn.

[21] Appl. No.: 414,729

[22] Filed: Mar. 31, 1995

[51] Int. Cl.$^6$ .................................................. G06F 9/46
[52] U.S. Cl. ........................ 395/682; 395/683; 395/674; 395/200.01
[58] Field of Search ................................ 395/650, 700, 395/674, 682, 683, 200.01, 800; 364/DIG. 1

[56] References Cited

U.S. PATENT DOCUMENTS

5,187,790  2/1993  East et al. .............................. 395/725
5,432,899  7/1995  Jwatani et al. ......................... 395/145

Primary Examiner—Thomas M. Heckler
Assistant Examiner—Majid A. Banankhah
Attorney, Agent, or Firm—Schwegman, Lundberg, Woessner & Kluth, P.A.

[57] ABSTRACT

A resource manager in a client/server computer network controls the availability of system resources. A system administrator generates a set of profiles which specify which system resources each user may employ for each of multiple application programs. Individual application programs may internally configure their possible choices of such system resources according to the appropriate profile on a dynamic basis.

9 Claims, 6 Drawing Sheets

|     | USER/GROUP 401 | APPLICATION 402 | RESOURCE 403 | VALUE 404 | CHANGE 405 |
| --- | --- | --- | --- | --- | --- |
| 410 | FINANCE | DATABASE | INTERFACE | NO | YES |
| 420 | FINANCE | SPREADSHEET | DDE SUPPORT | YES | YES |
| 430 | SALES | CUSTOMER LIST | INTERACTIVE | SMALL | NO |
| 440 | SALES | CUSTOMER LIST | ALLOW PRINT | NO | NO |
| 450 | SALESMGR | CUSTOMER LIST | SAVE DATA | YES | YES |
| 460 | RBJONES | CUSTOMER LIST | BATCH | YES | NO |
| 470 | ..... | | | | |

400

252 (VALUE, CHANGE columns group)
253

CLIENT/SERVER COMPUTER SYSTEMS HAVING CONTROL OF CLIENT-BASED APPLICATION PROGRAMS, AND APPLICATION-PROGRAM CONTROL MEANS THEREFOR

1. Field of the Invention

The present invention relates to electronic data processing, and more particularly concerns the control of system resources in computer systems arranged in a client/server configuration.

2. Background of the Invention

There are several broad types of computer systems. In a mainframe computer system, a single central processor complex running under an operating system executes application programs, stores databases, enforces security, and allocates all resources such as processor time, memory usage, and subsystem processing. Users interact with the system via "dumb" terminals, which essentially only display data and receive keystrokes. Peer-to-peer networks of systems such as personal computers are essentially standalone computers each running similar operating system programs, which can share application programs and data among each other according to a defined protocol. Client/server networks have a central server computer coupled via a communications medium to a number of client computers, usually smaller personal computers running under a conventional operating system. In the earliest client/server network model, the server was only a "file server" which could download data to the clients and upload data from them; application programs were executed entirely in the client computers. That is, the server's function was to store large amounts of data, which could then be shared among a number of smaller clients.

Most present client/server networks implement an "application server" model in which some or all application programs are split into two portions. A server portion executes within the server computer, while a separate client portion executes within each client computer from which a user can invoke the application. The two portions employ cooperative processing to pass data between the server and client computers; typically, most of the data is stored in the server. The first major application of this model was the processing of client queries against a central database, so that this model is also sometimes known as a "database server" network. Newer applications sometimes employ the terms "groupware" and "transaction processing" (TP). Advances in technology additionally allow multiple servers in the same network, so that a user at a client computer can choose to sign on to a number of different servers. A third client/server type of network is beginning to emerge; in the "distributed object" model, encapsulated objects containing both data and executable code may roam about the network, run on different platforms, and manage themselves. In this model, clients and servers are not fixed in particular computers: a given computer may be simultaneously a server for one application and a client for another, and a given application may run one computer as its server, and later run another computer on the network as a server.

A network operating system (NOS) mediates communications between servers and clients in a network. An NOS contains a server control module executing within the server computer, and a client control module executing within each client computer. These control modules cooperate with each other to transfer data (and sometimes code or other objects) over the network's communications medium between the servers and particular clients. They provide interfaces to the operating systems and application-program portions running in the client and server.

A client/server network contains system resources which can be shared by some or all of the other computers in the network. One or more server processors, for example, are scheduled among the tasks of different users. Memory pools of various sizes are allocated to tasks being executed and awaiting execution. Printers may be physically connected to the network as a print server, accessible via a print spooler to other computers on the network; storage devices may be similarly connected as separate file servers. Other capabilities are also considered to be system resources. For example, database applications generally have both an interactive and a batch mode for processing queries from a client. The interactive-mode resource uses large amounts of processor time, and is frequently restricted to short and/or time-critical queries; the batch-mode resource batches multiple queries together for processing at times of low processor load. Even the ability to execute a given application program can be considered a resource of the system.

Each user, sitting at a client computer in a c/s network, sees the server as a virtual part of his own system. For example, the client portion of a database application, being the same in each client computer or workstation, allows any user to choose the processor-intensive interactive mode. System printers usually appear as possible choices on the normal "Print" menu of a word-processing application program, alongside choices for local printers available only from the user's own computer.

While system resources appear to be at the total disposal of each user, in fact they are shared among all clients on the network and among all applications being executed by all users. Unlike the more abstract programming objects which can be multiplied forever, system resources are physical and finite, and must be divided among contending users.

In a mainframe type of computer organization, conventional central-processor-based operating systems schedule system resources, place restrictions upon particular users at particular times, block certain users from running certain applications or from running them in certain ways, and so forth. Servers in c/s networks can place restrictions upon the resources themselves, and upon which users can access certain resources, based upon the identity of the user. Some application programs can specify certain resources they can access, on an individual basis. That is, resource management in a c/s network is conventionally done by the server system (i.e., its operating-system program), or by restrictions which are hard-coded into each individual application program at the client level or specified by an initialization (.INI) file.

However, no facilities exist for specifying that user Alice, executing a particular program, is restricted to (for instance) run database queries only in batch mode, to avoid hogging the system with network traffic and processor time; but user Bob may run small queries in interactive mode, because he accesses only small amounts of data, or needs results quickly. The problem is that both users upload and run their queries from exactly the same database application program. Those in the art might respond by denying system permission at the server level to user Alice for the interactive mode, by restricting the number of database records in a query, or killing a query after a certain amount of time has been spent processing it. But Alice might also run another application program from her terminal for which she needs interactive mode for large queries. Or she may occasionally run smaller queries which can be serviced in interactive mode without significantly delaying other users; many database programs have facilities for estimating the resources required to fulfill a requested query. That is, the nature of present c/s networks make it difficult to achieve a sufficient granularity of control in allowing or denying particular system resources to particular users for particular application programs or in response to certain factors such as the size of a query. Dynamic control of such resources is also precluded.

SUMMARY OF THE INVENTION

The present invention provides enhanced and more precise control over the use of system resources by users and applications in a c/s network of computers. This control is inexpensive to implement, and does not interfere with conventional control capabilities already provided by the server's operating system or by the client's terminal.

The invention avoids the common proclivity of older application programs to "break" when new facilities are added at the system or network level.

Moreover, resource restrictions can be imposed in a way which is transparent to the user, rather than merely by returning an ugly error message if the user attempts to engage the forbidden resource.

The invention achieves these and other advantages through the cooperation of a different profile for each user, and a control facility in each application program which can read the current user's profile in order to manage a specified set of system resources. The response of the application to a particular profile might range from denying that user the ability to run that particular program at all, down to denying him the use of real-time queries or mandating the use of a certain printer for output of data from that particular application. Restrictions can be enforced by changing the program's own interface to the user under control of that user's profile. For example, forbidden choices may simply no longer appear on menus or other user-interface constructs within the application program itself, or can be subjected to reverification. That is, the application program, which actually exists as only a single program, appears as though it had been customized for each individual user—and this customization is dynamically variable by a system administrator or other authority. The coupling between the profiles and the application programs is mediated by parts of the c/s control program located in the server and in each client; this is simple to do, because both pieces of this program are sold together as a single package. Profiles are generated and stored in the server by a system administrator. When a user signs onto the network from his client terminal, the server downloads that user's profile to the terminal. The profile interacts with individual application programs in the client. When a user executes a particular application program in that terminal, the application program itself governs which system resources are available to the user, independently of the operating systems or other programs running on the client or on the server.

DETAILED DESCRIPTION OF PREFERRED EMBODIMENTS

Figure 1:
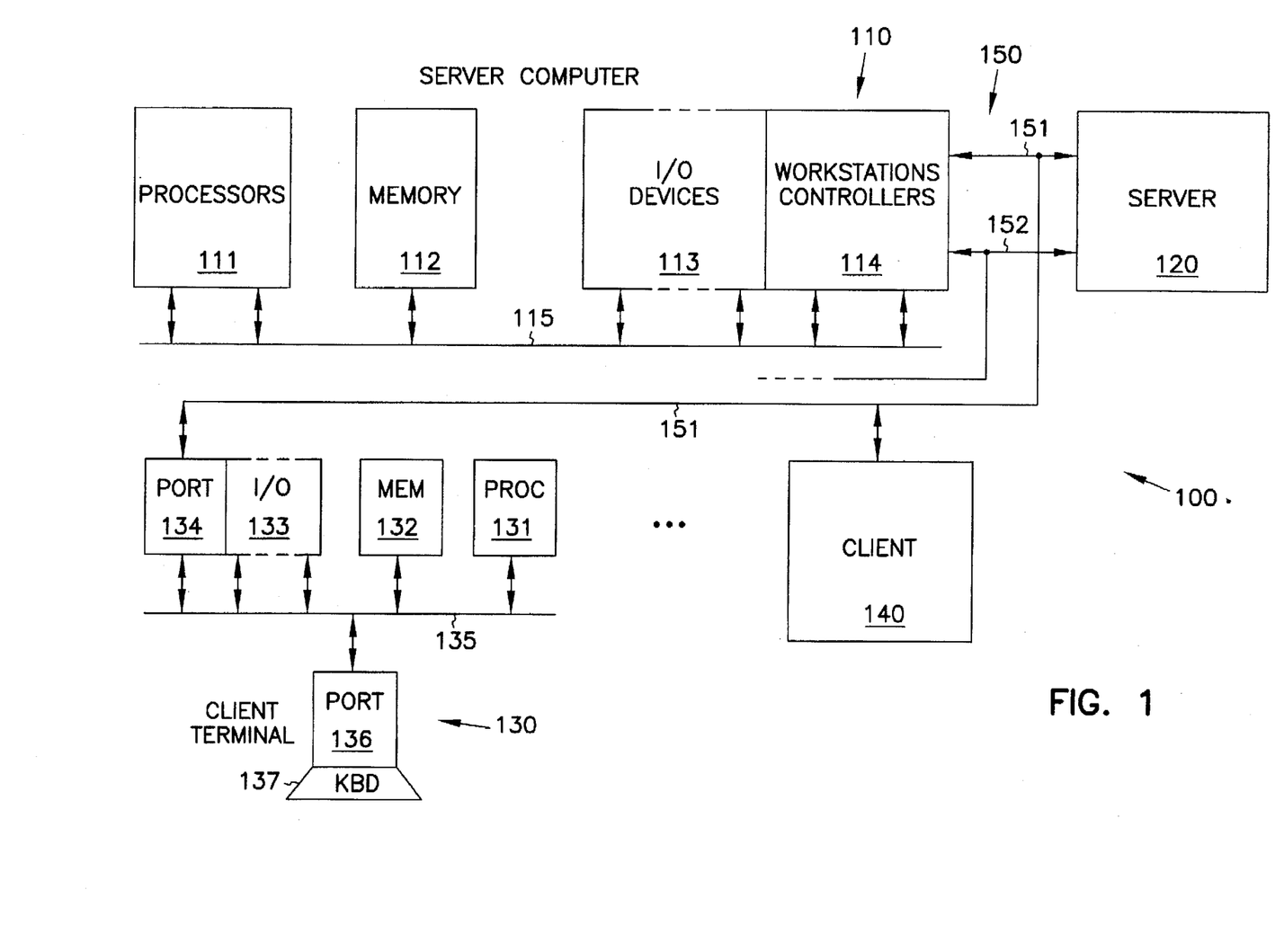
FIG. 1 shows a typical client/server computer network which forms the environment of the present invention.

FIG. 1 shows a network 100 of computers 110–140 configured in a client/server configuration.

Server computer 110 may be any type of system, from a relatively small personal computer (PC) to a large mainframe. In the particular implementation discussed below, server 110 is a mid-range computer, specifically an IBM AS/400 data-processing system. ("IBM", "AS/400," "OS/400," and "400" are registered trademarks of IBM Corp.) Very broadly, the AS/400 has one or more processors 111, memory 112, input/output devices 113, and workstations controllers 114, coupled together by one or more busses 115. WSCs 114 are physically a type of I/O device which interact with multiple terminals over communication facilities 150. A number of conventional facilities, such as APPC (Advanced Program-to-Program Communications) routers and LU6.2 (Logical Unit version 6.2) are available to handle the necessary communications protocols.

Additional devices, represented by block 120, may also be coupled to facilities 150 for interaction with the client terminals and with server 110. As mentioned previously, block 120 may represent one or more complete computer systems functioning as multiple servers in network 100. Communications 150 may assume any of a number of conventional forms, such as cables 151–152, switched telephone lines, wireless devices, and many others.

Client terminals 130, 140 are commonly personal computers (PCs) coupled to facilities 150 by cable 151 to form a local area network (LAN) with server 110. Other arrangements, however, may also be employed in any conventional manner. A typical PC 130 contains a processor 131, memory 132, I/O devices 133, and a port 133 coupled to cable 151. An internal bus 135 interconnects these components with a display 136 for presenting data to a user and a keyboard, mouse, and/or other input devices 137 for receiving data and commands from the user.

Figure 2:
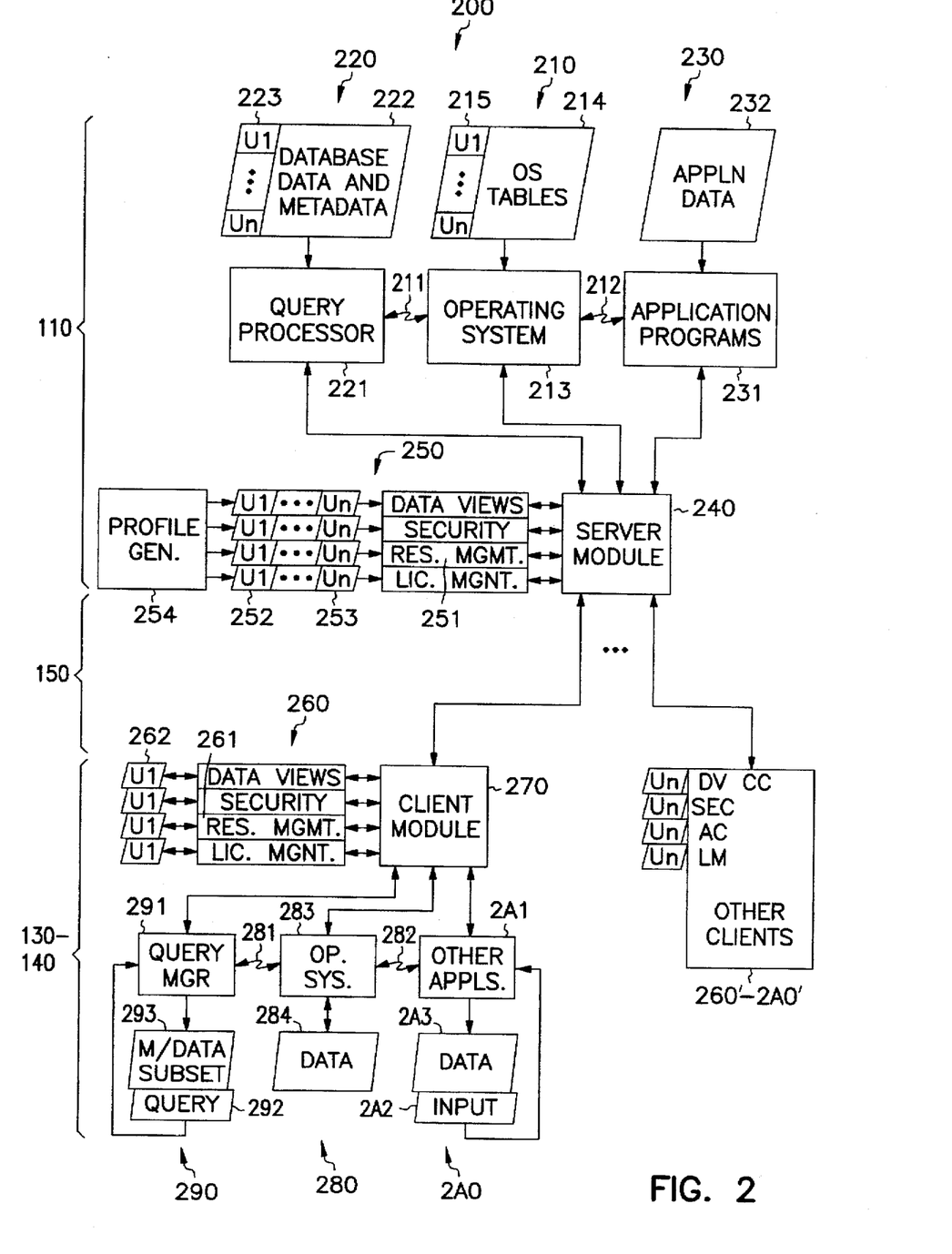
FIG. 2 is a schematic overview of the client/server network of FIG. 1, incorporating the invention.

FIG. 2 shows client/server network 100 from the perspective of the functions 200 performed by the computers of FIG. 1. Brackets at the left side indicate the component functions occurring within server system 110, communications facility 150, and one of the client terminals 130. A number of different users, represented by the labels U1–UN, operate respective ones of the terminals 130–140. Any of the users may operate any terminal; the association of a particular user with a particular terminal is established when user U1, say, signs on at terminal 130 by sending his logon and password over facilities 150 to server 110. (Again, in some networks 100, a user may be able to sign on to any one of multiple servers 110–120.) The association of user and terminal persists until the user signs off from his session.

Conventional operating system 210, an IBM OS/400 in this example, manages the physical facilities of server 110, and controls the execution of tasks such as 220–230 running on the server, as symbolized by arrows 211, 212. Functional modules 213 of the operating system employ a number of tables 214 for a number of conventional purposes such as system configuration, task priorities, and security. For example, OS/400 employs a number of system user profiles 215 to specify data for each user U1–UN, including the access rights of each user to system objects (data and program commands), the language for messages to that user, and library lists.

Of the many applications which can be executed, database 220 is a typical important example. In FIG. 2, all other applications are lumped together as blocks 230. Code modules 221, 231 perform the server-resident functions of the applications upon data 222, 232. Some data may include conventional profiles 223 specifying information unique to each user U1–UN, such as the tables accessible to that user. Applications 220–230 usually require system resources to perform their tasks. For example, server I/O devices 113 may include printers and archival storage. System-controlled printers (not shown) may also attach outboard to communication facilities 150. Query processor 221 has an interactive mode wherein it executes queries and returns results as the queries are received, and a batch mode wherein operating system 210 stores incoming queries until slack periods, whereupon it passes them to be processed together in module 221. The ability to run query processor 221 at all may be considered a system resource.

Server control module 240 executes within server 110, FIG. 1, to control all communication from server functions 210–250 within server 110 to client functions 260–2A0 executing within each oft he client terminals 130–140. Client module 270 executes within each client terminal such as 130, FIG. 1, to control communication from client functions 260–2A0 to server functions 210≡250 executing within server 110. The control is physically mediated by transmitting and receiving data over communication facilities 150, FIG. 1. Modules 240 and 270 contain conventional cooperating protocols for packaging and timing data to be communicated between server 110 and a client 130. In addition, these modules implement conventional addressing techniques for identifying which of the clients attached to the server is to receive each data package, and for identifying to the server which client has sent each data package in the reverse direction and which user is signed on at that client.

Conventional operating system 280, for example Microsoft Windows ("Microsoft" is a registered trademark of Microsoft Corp.), manages the physical facilities of client 130, and controls the execution of tasks such as 290–2A0 running on the server, as symbolized by arrows 281, 282. Functional modules 283 of the operating system employ a number of tables 284 for a number of conventional purposes such as system configuration and task switching. In a multi-server network 100, client module 270 may also specify which server 110–120 is to receive particular data packages.

Again using a database as an example of an application program, query manager 291 receives queries 292 from the user signed on at client terminal 130, and displays a resulting subset 293 of the data from tables 212 in the server. As is typical in many application programs in a client/server network, a portion 211 of the application is physically located and executes in the server 110, FIG. 1. Another portion 291 of the same application executes in the client terminal 130. This client portion 291 may be downloaded from server 110 to terminal 130 upon a request from the user, or it may reside permanently within terminal 130; in either case, it is executed by processor 131 of the terminal. Others of the application programs in terminal 130, lumped together as 2A0, may have functions similarly split between client code portions 2A1 and server portions 231, or they may execute entirely within a client terminal, using operating-system modules 213 or other modules residing within the server.

Other client terminals include similar modules, indicated in FIG. 2 as 260'–2A0'. The client modules are usually the same in each terminal. Other applications may be the same or different among the client terminals.

A set of tools cooperates with server and client modules 240 and 270 to provide additional functions by further controlling the communication of information between server 110 and clients 130–140 in network 100. At the present time, these tools provide license-management functions, security enhancement, and database view control as described in commonly assigned application U.S. Ser. No. 08/414,483, filed on the same date herewith. Each tool has a portion which resides within server computer 110, and another portion which resides within each client terminal 130–140. If network 100 has multiple servers, such as 120 in FIG. 1, then another server portion resides within each server. The present invention, which provides control of system resources, has a server portion implemented in module 251, profiles 252–253, and profile generator 254 located within server 110, and a client portion implemented in module 261 and profile 262 located within each client such as 130.

Figure 3:
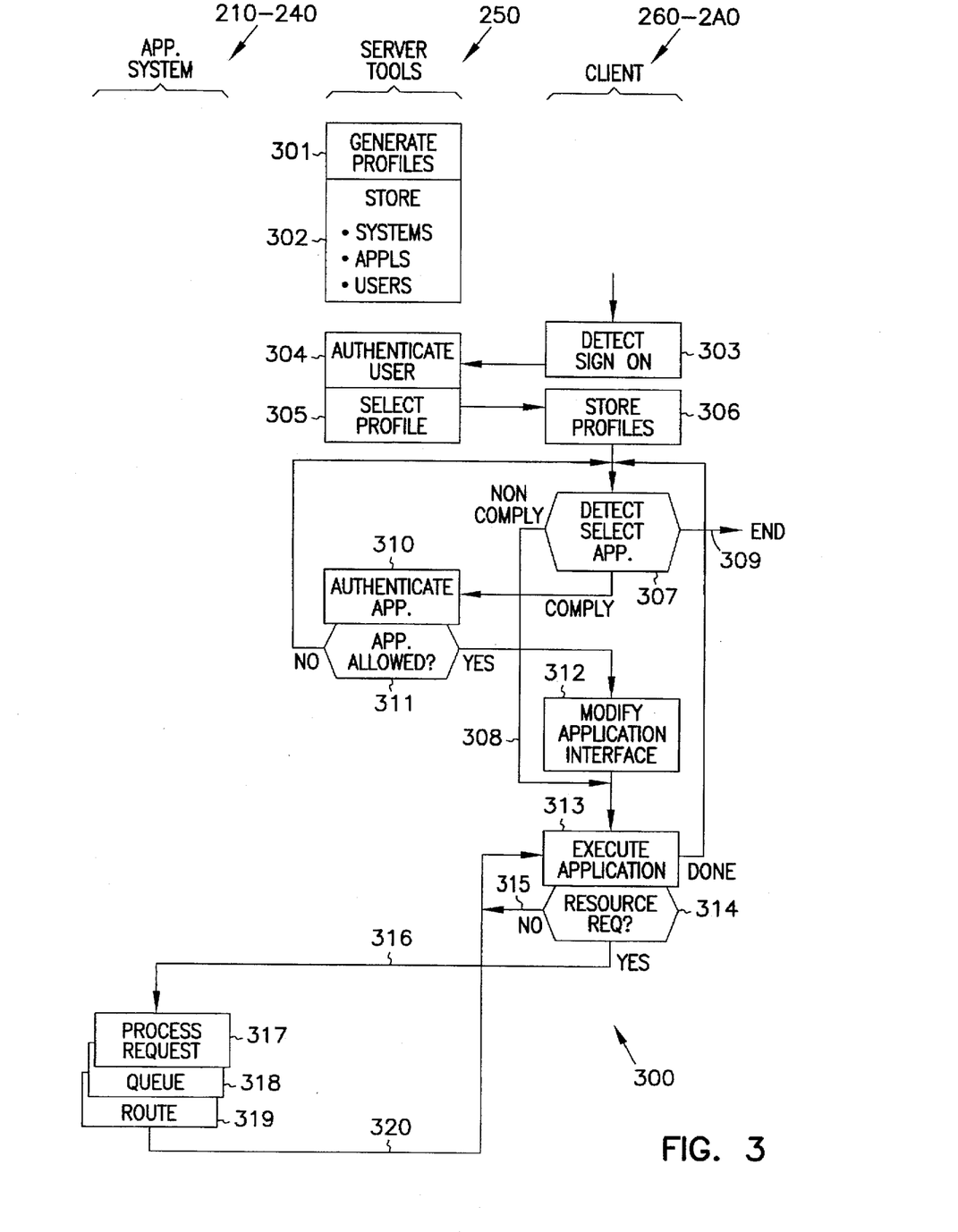
FIG. 3 is a flowchart showing the operation of the invention within the system of FIG. 2.

FIG. 3 is a flowchart of a process 300 for carrying out the invention in the system of FIG. 2. The horizontal location of each block indicates where that block actually occurs, whether in a server block 210–240, in the server portion 250 of the resource manager, in the client portion 260 of the resource manager, or in another block 270–2A0 of the client.

Initially, the network or system administrator decides which users are allowed to employ which applications to access which systems resources. The administrator then employs block 301 to produce profiles (shown schematically in FIG. 4, and discussed below) listing system resources by user and by application. For security reasons, access to block 301 is limited by conventional security facilities of server 110. Block 302 stores these profiles in a secure form within server 110. For a multi-server system, each server may have its own set of blocks 301–302, as well as the other blocks in the "server tools" column of FIG. 3.

When a particular user signs on at one of the client terminals 130, block 303 in resource manager client module 260 detects the user's identity as it passes through client module 270 to the server 110, or to another server in network 100 requested by the user. The server then authenticates the user's identity at block 304. Block 305 selects the profile associated with that user, and transmits it to the proper client terminal. The profile is preferably encrypted by any conventional means, to prevent interception on communications facility 150, and to prevent alteration within the terminal after block 306 receives and stores it. In this embodiment, block 305 downloads profile portions for each application as that application is connected; however, the entire profile may be downloaded as one piece if desired.

When the user then selects an application, via the operating system or other conventional means, block 307 in resource-manager client module 260 determines whether or not that application program complies with the present invention. In this embodiment, the application name is sent along with a password for security against falsification. However, other means, such as a database table, could be used instead. If the application is not aware of the resource manager, dashed line 308 allows it to be executed in a conventional manner. This provides compatibility with older programs and with those which do not employ system resources controlled by the invention. Exit 309 terminates the client's operation when the user signs off or for any other reason.

If block 307 senses that the requested application complies with the resource-management system, it transmits the identity of the application to block 310 in the server computer for authentication. This step is desirable in preventing application spoofing, wherein code at the client pretends to represent an application that it is not, or to claim resources that it is not entitled to. Preferably, the application identity is encrypted before transmission, to prevent a network eavesdropper from intercepting the true identity and modifying or misusing it. If the authentication is proper, block 310 transmits a positive response to block 311 in the server. Appropriate encryption and authentication methods are conventional in the art. If execution is not allowed, block 311 returns control to block 307 for selection of another application. (Alternatively, it would be possible to have block 307 employ the specific user profile stored by block 306 to merely eliminate or dim menu choices for the non-allowed applications, so that the user could not choose them in the first place.) That is, the ability to run a given application at all can be treated as a system resource for the present purpose.

Block 312 actually enforces the resource restrictions imposed by the profile stored at 306 for the particular user for the particular application program, represented by block 313. Application 313 may be any one of a number of conventional programs, such as database programs, spreadsheets, word processors, and so forth. The application may run entirely in the client, or, more commonly, may be a network version which also includes a portion such as 317 concurrently executing in the server. When the application program requests system resources, block 314 sends a message to the appropriate block 317 for processing the request. Block 317 may be physically implemented as a conventional device driver, a portion of the operating system 213, in the server portion of a networked application, or in other conventional ways. As mentioned previously, the profile may also specify the manner of processing a request. For example, subblock 318 may queue a batch-mode database query for later processing, or subblock 319 may route the request to a different device, such as a low-speed printer. In addition, server operating systems 213 frequently contain conventional facilities for balancing workloads in different subsystems of the network; block 314 could furnish priority information for the current user and application obtained from stored profiles at block 306. Line 320 returns data or any acknowledgements to the application executing in block 312 of the client.

Returning to block 312, there are various ways to couple a profile to an application program so as to control which system resources a particular user may obtain from that application. For example, a crude method would be to place a sentry block (not shown) in line 316 so as to block unauthorized requests from ever reaching block 317. While such an approach would work, it would create user confusion and frustration by presenting apparently valid choices in the application program which would return error messages when selected, or which might even falsely appear to the user as system malfunctions.

Many modern application programs 313 employ external initialization (.INI) files, associated either with the specific application or with the operating system 283, which contain specifications for executing the application, and/or which specify choices within the application or choices presented to the user. For example, installing a new printer under the Microsoft Windows operating system modifies a WINDOWS.INI file to include a reference to the printer, so that a separate word-processing program running under Windows can access that file for a list of currently installed printers, and present that list—now including the new printer—to a user when he requests a PRINT operation for a document within the word processor. Block 312 could thus itself edit such an initialization file dynamically—that is, whenever a particular user selects an application at block 307—so as to change the application's own menu choices, the list of facilities which it presents to the user. Another method is to establish a special formal application program interface, (commonly known as "API") a documented call which allows one program to access a certain function of another program.

Figure 4:
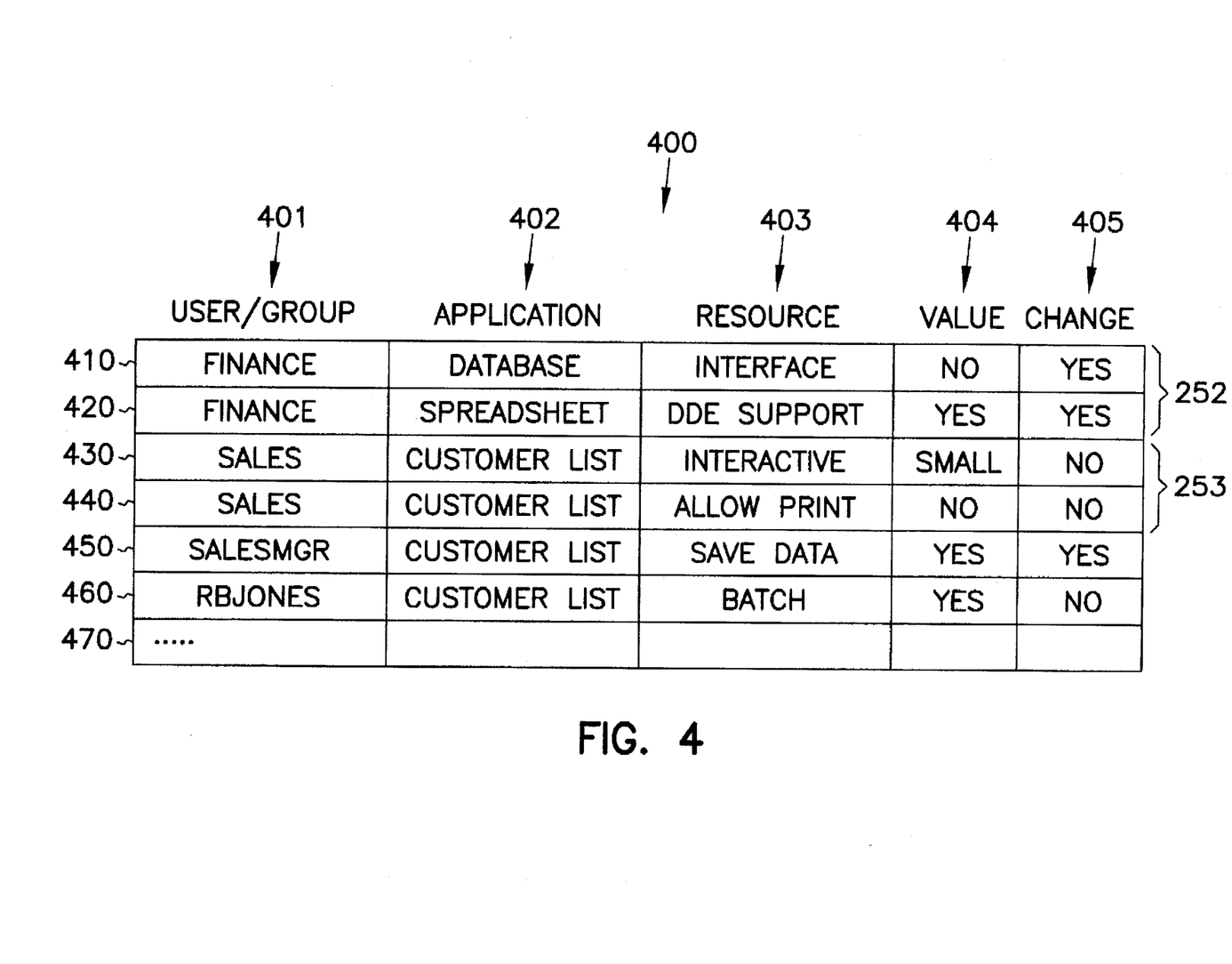
FIG. 4 details representative profiles of FIG. 2.

FIG. 4 represents a set 400 of profiles such as 252–253 in FIG. 2, which are employed in the procedure 300 described in FIG. 3. In the IBM AS/400, the OS/400 operating system includes an integrated relational database which uses the well-known SQL (structured query language) interface. A set of profiles may constitute an ordinary table in this database. Each row 410–470 of database table 400 lists a user or predefined group of users 401, the name 402 of a particular application program, a resource 403 potentially used by that program, a value 404 showing a status of that resource for that particular user when executing that particular application, and a change status 405 for the value 404.

Column 401 in each row profile contains a representation of a sign-on identification, either a user-id for one user or a group name which can be specified in a conventional AS/400 system profile (not shown) of that user. One person may of course have multiple sign-ons or user identifications, and may be a member of multiple groups, and thus may have different resource privileges for different purposes, even within the same application program. The set of rows which name one particular user, either specifically or by a group of which he is a member, forms a profile such as 252 and 253 in FIG. 2 for that user.

Column 402 lists the names of various application programs which are subject to resource manager 251, FIG. 2—that is, those which block 307, FIG. 3 recognizes as being "compliant." If an application is compliant, but is not listed in any row of table 400 for a particular user or group, then that user or group cannot execute the application program. (For implementation-specific reasons, block 311, FIG. 3, actually checks a physically separate table which duplicates the information in columns 401 and 402.)

An entry in column 403 specifies one of the system resources potentially available to the application program specified in column 402 of the same row. These resources may include such functions as the previously mentioned interactive-query mode of any database program, distributed-data environment (DDE is a conventional method for sharing data) support, and printing on the system printers.

Column 404 specifies an initial access value for the resource of column 403; e.g., a "NO" in column 404 of row 410 indicates that a user in the FINANCE group is blocked from using the interactive mode when the spreadsheet application program is invoked at block 313, FIG. 3. That is, he can use only the batch mode for queries. Normally, users would not be permitted to change their own authorizations for a resource; however, it is sometimes useful to provide this capability. A "YES" entry in column 405 of the same row means that a user in this group may, during execution of this program, later change his authorization so as to use the interactive mode.

The use of profiles in the present system allows a great deal of flexibility. Resources may be grouped, such as "system printers". Some resources may be permitted only under certain limitations. For example, some database programs return a "cost" number denoting the estimated amount of processor time required for a particular query; an entry such as "SMALL" in row 430 indicates that interactive queries are allowed to this user in this application when the estimated cost is below a predetermined threshold. This situation is quite common for many applications, as will be explained in connection with FIG. 5. Many combinations of resources can be specified, and varied needs can be accommodated. For example, one user may be allowed to perform queries in the interactive (real-time) mode while running a customer-list application, yet the same user can be limited to batch mode—or to off-peak hours—while in a payroll application program, because running an entire payroll requires so much of the server's time that it should only be done when other demands are light. As another example of increased flexibility and granularity, resources can be treated differently depending upon where they are called from within a single application. For instance, the Sales Department group in FIG. 4 has the use of system printers, but a dedicated mailing-label printer could be made available as a choice only from a menu which appears at the end of a verification routine within the application program.

The use of an existing system database to store the profiles as ordinary tables allows any existing data-entry program to serve as the profile generator 254 of FIG. 2. In systems where no such facility already exists, the invention may employ any conventional database program or ad hoc facility for this purpose.

Figure 5:
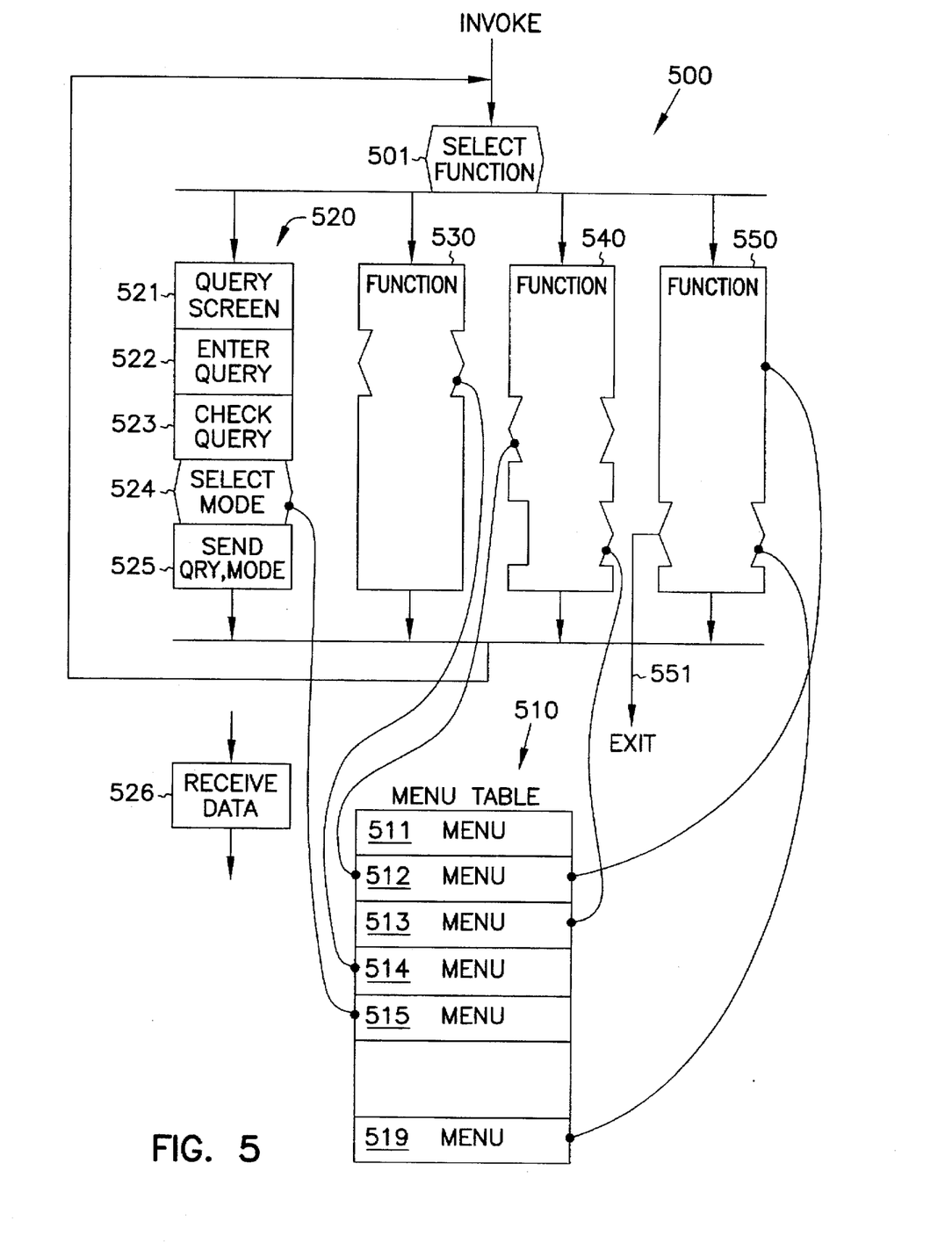
FIG. 5 shows a resource-manager-controlled interface of an application program according to the invention.

FIG. 5 is a high-level block diagram of the client module of a typical application program 500, such as a query manager 290, FIG. 2, incorporating the present invention. For specific details, reference is made to the publicly available ShowCase Vista query application ("ShowCase" and "Vista" are trademarks of ShowCase Corporation). In an interactive application, normally the first operation after invocation is the display of a menu allowing the user to choose among several major tasks, such as query input 520, data display 530, etc. The Vista application 500 has a set 510 of identified menu objects associated with it. Such objects can be created with conventional program-development tools. They conventionally include dialog panels, radio buttons, selection boxes, drop-down lists, and other constructs. An application might display multiple constructs at the same time at different positions on the user's screen. That is, several types of choices might be available simultaneously.

During an execution of program 500, a block such as 521 presents a query screen, block 522 receives a user's request, which is then checked at block 523. Block 524 then selects menu 515 for the user to choose a processing mode: interactive, batch, etc. When the choice has been entered, block 525 sends the query and the mode choice to the database server module 220, FIG. 2, via client and server modules 270 and 240. Module 220 then processes the query and returns data to the database client module 290 at block 526. This block may present a message or other indication to the user that the data has arrived, or may merely display the data.

When task 520 has completed, application 500 returns to block 501, which then allows the user to choose any of the tasks 520–550. The other tasks 530–550 operate in an overall similar manner. Line 551 shows the end of execution of application 500.

Figure 6:
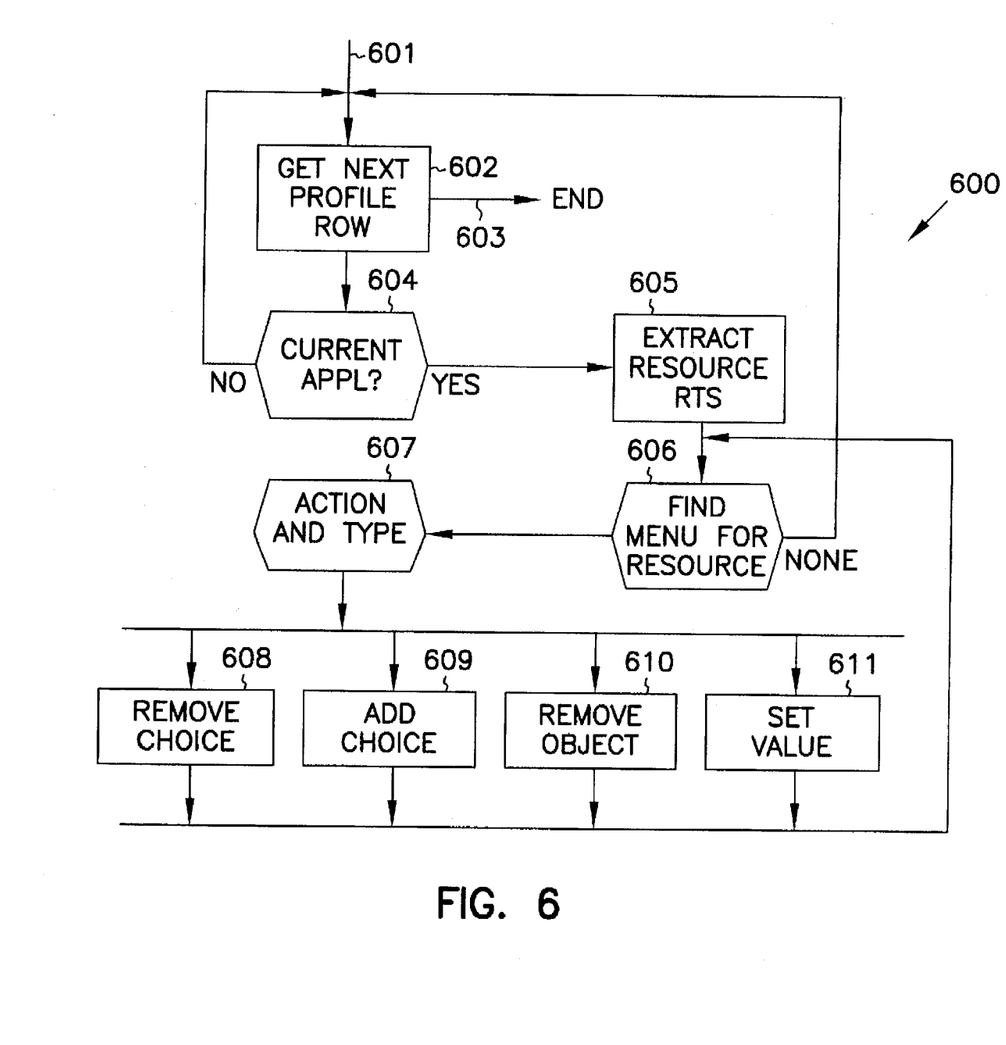
FIG. 6 is a flowchart detailing the control of an application-program interface of FIG. 5 according to the invention.

FIG. 6 is a flowchart of a routine 600 for modifying the interface of an application program 500 as required by block 312, FIG. 3. The individual menu objects 511–519 in FIG. 5 initially include all choices available to any user at any time during execution. The purpose of routine 600 is to modify the set 510 of menu objects for the specific application program 500 in accordance with the profile for the particular user who is currently executing that program.

Block 312 enters routine 600 at line 601. Block 602 gets successive rows of the profile 252 for the current user. When there are no more rows, routine 600 exits at 603.

Because profile 252 contains rows for all application programs available to the current user, block 604 selects only those rows relevant to the current application, as identified in column 402, FIG. 4. For a relevant row, block 605 reads column 403 to determine which resource is being specified. Block 606 finds a menu object in the set 510 which pertains to that resource. Block 607 determines from profile columns 404 and 405 what action is necessary to modify the object. Blocks 608–611 indicate some of the actions that could be performed. Block 608 removes a choice from a selection list, radio-button set, or similar construct, either totally or by graying it out on the construct. Block 609 can add a choice which was not already on a selection list. Block 610 removes an object altogether, so that no choice is available to the user. Block 611 sets a value, value range, or similar limitation into a list, dialog box, etc. After the proper operation, control returns to block 606 to find other menu objects. If there are no more, control returns to block 602.

FIGS. 3 and 6 show the modification of menu objects 511–519 as occurring before execution at block 313. FIG. 3 additionally shows the user's profile being downloaded at the time the user signs on to a session at the client terminal. In that case, the menu items can be changed from the server only session-by-session, and remain the same for all invocations of an application. It is also possible, however, to download profiles at other times, so as to allow menu items to change on a dynamic basis, whenever a system administrator modifies a profile, or by some other factor, such as time of day, so that each execution of an application could present different sets of choices. Moreover, it is possible to run routine 600 during execution of the application program, so that menu choices could vary even during a single execution of an application.

Having described a preferred embodiment and a few of the many variations and alternatives within the scope and spirit of the present invention which may occur to those skilled in the art, we claim:

1. A method of managing a set of shared system resources in a computer network having at least one server coupled to a plurality of clients each containing a plurality of application programs executable by a plurality of users at said clients, said programs having interfaces for allowing said users to choose dynamically among said shared system resources, said method comprising:

generating in said server a plurality of profiles specifying the allowability of individual ones of said shared system resources within particular ones of said application programs for certain ones of said users;

identifying one of said users at one of said client computers;

in response to said identification, selecting certain information from said profiles corresponding to said individual shared system resources for said particular application programs for said one identified user;

detecting at said one client computer a request for a particular one of said application programs by said one user;

dynamically modifying at least one of said user interfaces for said particular one application program in response to said certain profile information corresponding to said identified one user for said particular one application program so as to make available to said one user only those of said shared system resources specified by said profile information for said particular one application program for said identified one user.

2. A resource manager for a client/server network of computers coupled together by a communications means, said network executing a plurality of application programs having a server portion located in a server computer in said network and having a client portion located in one or more client computers in said network and invoked by one of a number of users, said network further including a plurality of different system resources potentially usable by said application programs and physically shared among said application programs, each said application-program client portion having a user interface from which said one user can select different ones of said system resources during an execution of said client portion, said resource manager comprising:

a set of profiles, each profile specifying said one user and a number of said application programs, and specifying, for individual ones of said number of application programs, a number of particular ones of said shared system resources, and specifying, for each of said particular resources, a number of rights of said one user to each of said particular resources for each of said individual application programs;

means for detecting the identity of said one user at any one of said one or more client computers, and for selecting that profile corresponding to said one user;

means for selecting individual portions of said selected profile corresponding to said individual application program;

means for modifying said user interface for said individual application program in response to said individual portions of said selected profile so as to allow said user at said client computer to choose only those of said shared system resources specified by said individual portions.

3. An individual interactive application program executable by a number of users in a client/server computer network having a number of physically shared resources, said network containing a stored profile specifying a particular one of said users, a number of application programs including said individual application program, and specifying, for each of said application programs, a number of selectable ones of said shared system resources, and specifying, for each of said selectable resources for each of said application programs, a number of rights of said particular one user to each of said certain resources, said individual one application program comprising:

means for selecting from said stored profile certain information peculiar to said individual application program for said particular one user;

means for selecting among a plurality of functions in response to inputs from said one user;

means responsive to said selecting means for performing said functions;

a number of user-interface means within said function-performing means, each of said user-interface means presenting to said one user choices among one of said shared system resources;

interface modifying means coupled to a plurality of said user-interface means for modifying said choices of respective ones of said shared system resources in response to said rights of said particular one user with respect to said individual application program as specified in said profile information.

4. The method of claim 1, wherein the step of generating, comprises the steps of:

for each user, identifying one or more of said application programs which the user is authorized to execute; and for each authorized application program, identifying which shared system resources the user is permitted to access.

5. A method of managing a set of shared system resources in a computer network having at least one server coupled to one or more clients, the one or more clients for use by one or more users, the one or more clients capable of executing a plurality of applications, comprising the steps of:

generating a plurality of profiles in a server, the plurality of profiles specifying which shared system resources are available to a particular user for a particular application;

identifying a user signing onto the computer network using a client;

associating a profile of the plurality of profiles with the user;

downloading profile information from the server to the client based on the profile;

detecting a request for execution of an application by the user;

identifying available shared system resources based on the user and the application using the profile information; and dynamically modifying a user interface to reflect the available shared system resources, to control access of the user to the set of shared system resources.

6. The method of claim 5, wherein the step of dynamically modifying comprises the step of editing an external initialization file associated with the application according to the profile information, to control system resource options presented to the user by the application.

7. The method of claim 5, wherein the step of dynamically modifying comprises the step of controlling system resource options presented to the user by the application using a formal application program interface.

8. The method of claim 5, wherein the step of generating a plurality of profiles comprises the step of:

constructing a profile for each user, the profile including definitions of which applications the user is authorized, and for each authorized application, a definition of which shared system resources the user is permitted to access.

9. The method of claim 8, wherein the step of detecting a request for execution of an application by the user, comprises the steps of:

comparing the application to the definitions in the profile for the user to determine if the user is authorized to execute the application; and if the user is authorized to execute the application, executing the application.

* * * * *